3,416,940
COATING OF THE SURFACES OF LIGHT TRANSPARENT MATERIALS ASSOCIATED WITH LIGHT SOURCES
David Graham Guthrie, Slough, England, assignor to Saunders Roe & Nuclear Enterprises Limited, Hayes, England
No Drawing. Filed Nov. 9, 1964, Ser. No. 409,938
Claims priority, application Great Britain, Nov. 20, 1963, 45,735/63
8 Claims. (Cl. 117—8.5)

ABSTRACT OF THE DISCLOSURE

Discontinuous phosphor coatings are applied to the inner surfaces of containers, such as cathode ray tubes, by providing a coating of an adhesive on an inner surface of the container, heating selected areas of the outer surface of the body to render the adjacent inner surface non-adhesive, and applying phosphor particles to the inner surface which will adhere only to non-heated areas.

---

This invention relates to a technique for accurately applying phosphor coatings to limited areas, particularly on inaccessible surfaces or on complex shapes.

Phosphor coatings are employed in light producing applications such as cathode ray tubes, fluorescent light tubes and nuclear light sources where electrons excite the phosphors to luminescence. In these applications the phosphor coats are frequently formed on the inside surfaces of transparent containers made of glass or silica or other suitable materials, and such surfaces are usually inaccessible, consequently problems arise if it is necessary to restrict the areas to which the phosphor is applied.

It is known to form phosphor coats by spreading a viscous binder material such as orthophosphoric acid upon the surfaces to be coated, causing the phosphor to adhere to the binder and then baking to convert the binder to a non-viscous form to fix the phosphor in position.

Up to the present time it has been difficult to achieve an effective means of producing limited areas or patterned areas of phosphor coating with adjacent areas of clear surface with well defined boundaries. It is, therefore, an object of the invention to disclose a relatively simple, inexpensive and effective means of overcoming the difficulty of controlling the areas of a surface to be phosphor coated.

The invention consists in a method of causing phosphor coatings to form in accurately controlled areas on surfaces by destroying, fixing or otherwise rendering non-adhesive a viscous material or binder adhering to said surfaces in selected areas by the application of heat to said viscous material in said selected areas prior to distributing a phosphor upon said surface.

Preferred features of the invention will become more readily apparent from the following description which is given by way of example only, wherein the method comprises the steps of firstly applying a uniform layer of binder, such as potassium silicate, sodium silicate, or other viscous material, to a surface such as the interior of a glass container, bulb or tube. The binder may be conveniently added as a 1% solution of 90% orthophosphoric acid in acetone. The foregoing percentages, and all percentages herein, are on a weight basis unless otherwise indicated. The acetone is evaporated away with warm air to leave the orthophosphoric acid adhering as a viscous layer to the inside of the bulb. If required, a substantially uniform distribution of orthophosphoric acid may be obtained by such means as that disclosed in our copending application Ser. No. 377,092, now abandoned Secondly, the novel step of locally destroying the binder over a predetermined surface area is made by heating the outside of the container by a flame or very hot air jet; the area or pattern to be thus treated is controlled by a suitable stencil which protects other areas of the container from the applied heat.

The destruction of the binder leaves such predetermined areas of the container locally clean and free from the unhardened or active form of the adherent, so that during a subsequent stage of the process of phosphor coating when phosphor powder is introduced to the container, distributed by agitation, any excess removed, and then fixed by baking, none will adhere to those areas devoid of binder. Demarcation between the clear areas and coated areas will be extremely sharp and well defined.

The flame temperature and time for which heat is applied to the glass are determined primarily by the glass thickness and area to be heated. The speed at which the internal surface of the glass reaches the setting temperature of the binder controls the length of heating time necessary. It is desirable to keep the time of heating short in order to keep the rest of the bulb cool, hence a thin glass wall is preferable, as a cooler flame can then be used with less chance of straining the glass.

For example, to produce clear lengths along a coated capillary tube having walls 0.001 inch thick and using orthophosphoric acid as a binder, a quarter inch gas flame applied for five seconds to the sections of the tube required to be clear is sufficient. The lengths of tubing to either side of the section being cleared of binder are protected by close fitting concentric metal tubing over them Clear areas or "windows" in phosphor coats can be produced by applying the flame to the glass through a stencil of appropriate size and shape. For glass walls one to two millimetres thick and oxygen coal gas flame is desirable, in order to destroy or harden the acid within five seconds. If the heating is continued for much longer the boundary of the phosphor coat is less sharp.

In this way any desired shape, including letters, figures and symbols, can be produced in the form of a phosphor layer, even when the inside surface to which the phosphor adheres is completely inaccessible to direct means of area control.

Obviously the invention is not solely applicable to the binders quoted hereinbefore, but may be applied to any other binders rendered inoperative by heat nor is it to be inferred that the material of the container shall necessarily be glass, but that it may be made of silica or any other transparent or translucent material, and may be applied to opaque materials such as metal shields or encapsulating means if required.

Furthermore, although in general the heat will be applied through the substrate upon which the phosphor is to be coated, heat can also be applied satisfactorily direct to the binder or fixative, in order to render it non-adhesive or non-viscous, although when the surface is easily accessible other methods of leaving clear areas in phosphor coatings are available.

I claim as my invention:

1. A method of providing a discontinuous phosphor coating on the inner surface of a container at least a portion of which is translucent, comprising the steps of coating at least a part of the inner surface of said translucent portion of said container with a viscous liquid adhesive material which adheres to said inner surface, heating the outer surface of said container at a plurality of separate areas each adjacent to the coated inner surface to render said adhesive material non-adhesive at each area of said coated inner surface corresponding to each heated area and applying phosphor particles to the inner surface of said container to adhere said particles to non-heated areas of said inner surface where said coating of said adhesive material remains adhesive.

2. A method as claimed in claim 1 including the further steps of heating said inner surface to which said phosphor particles are adhered to fix said phosphor particles in position on said inner surface.

3. A method as claimed in claim 1 wherein said container comprises glass.

4. A method as claimed in claim 1 wherein said container is a bulb or tube.

5. A method as claimed in claim 1 wherein said adhesive material is selected from the group consisting of orthophosphoric acid, potassium silicate and sodium silicate.

6. A method as claimed in claim 1 wherein said step of heating said outer surface is accomplished by applying heat to said outer surface through a stencil whereby areas not masked by said stencil are heated.

7. A method as claimed in claim 1 wherein said step of heating said outer surface is accomplished by applying the heat of a plurality of separate flames to said outer surface.

8. A method as claimed in claim 1 wherein said container comprises silica.

References Cited

UNITED STATES PATENTS

| | | | |
|---|---|---|---|
| 3,226,246 | 12/1965 | Vermeulen et al. | 117—33.5 X |
| 3,317,319 | 5/1967 | Mayand | 117—33.5 X |
| 1,905,430 | 4/1933 | Ball | 117—46 X |
| 2,108,645 | 2/1938 | Bryant | 117—25 |
| 2,289,156 | 7/1942 | Weinhart | 117—18 |
| 2,311,513 | 2/1943 | Bell et al. | 117—33.5 |
| 2,344,081 | 3/1944 | Claude | 117—33.5 |
| 2,659,679 | 11/1953 | Koller | 117—33.5 |
| 2,827,390 | 3/1958 | Garrigus | 117—8.5 |
| 3,025,161 | 3/1962 | Rychlewski | 117—33.5 X |
| 3,060,024 | 10/1962 | Burg et al. | 117—33.5 X |

WILLIAM D. MARTIN, *Primary Examiner.*

M. R. P. PERRONE, JR., *Assistant Examiner.*

U.S. Cl. X.R.

117—9, 18, 25, 33.5, 46